United States Patent [19]

Baurand et al.

[11] Patent Number: 5,894,395
[45] Date of Patent: Apr. 13, 1999

[54] CONTACTOR-CIRCUIT BREAKER

[75] Inventors: Gilles Baurand, Montesson, La Borde; Karim Benkaroun, Sartrouville; Alain Gousset; Jacques Olifant, both of Nanterre; Daniel Riffaud, Paris, all of France

[73] Assignee: Schneider Electric SA, Boulogne Billancourt, France

[21] Appl. No.: 09/005,022

[22] Filed: Jan. 9, 1998

[30] Foreign Application Priority Data

Jan. 14, 1997 [FR] France ................ 9700368

[51] Int. Cl.$^6$ ............................................... H02H 3/00
[52] U.S. Cl. .................. 361/87; 361/42; 361/93; 361/115
[58] Field of Search ............. 361/42, 115, 93, 361/78, 87, 100

[56] References Cited

U.S. PATENT DOCUMENTS

| 3,963,967 | 6/1976 | Gurwicz et al. | 317/123 |
|---|---|---|---|
| 4,272,687 | 6/1981 | Borkan | 307/115 |
| 4,274,122 | 6/1981 | Hansen et al. | 361/159 |
| 5,546,268 | 8/1996 | Hurley et al. | 361/154 |

FOREIGN PATENT DOCUMENTS

| 0 387 730 A2 | 9/1990 | European Pat. Off. | H02H 9/04 |
|---|---|---|---|
| 29 43 062 A1 | 5/1980 | Germany | H01H 51/22 |

OTHER PUBLICATIONS

D.W. Stafford, et al., "Zener Diode Sharing", IBM Technical Disclosure Bulletin, vol. 19 No. 5, Oct. 1976, p. 1745.

*Primary Examiner*—Richard T. Elms
*Assistant Examiner*—Stephen Jackson
*Attorney, Agent, or Firm*—Oblon, Spivak, McClelland, Maier & Neustadt, P.C.

[57] ABSTRACT

Contactor-circuit breaker housing firstly power poles and an electromagnet serving to activate the moving contacts in contactor mode and including a fixed magnetic circuit, a moving magnetic circuit and a coil whose electric supply is controlled by a switch, and secondly at least one current sensor serving to control a releasing electromagnet. The activating electromagnet and the releasing electromagnet are constituted by a single electromagnet whose moving magnetic circuit is a pivoting pallet linked mechanically to the contact-holders of the poles and having a weak moment of inertia. An electric unit is provided for the rapid reduction of the magnetic flux, triggered by an electronic control device associated with the current sensor.

10 Claims, 2 Drawing Sheets

CONTACTOR-CIRCUIT BREAKER

BACKGROUND OF THE INVENTION

1. Field of the Invention

This invention relates to a contactor-circuit breaker housing firstly power poles which include moving contact bridges cooperating with fixed contact bridges, and an electromagnet serving to activate the moving contacts in contactor mode and comprising a fixed magnetic circuit, a moving magnetic circuit and a coil whose electric supply is controlled by a switch, and secondly at least one current sensor serving to control a releasing electromagnet.

2. Discussion of the Background

A contactor is used to cut off or to supply, in response to a control signal, the supply line of a load such as a motor. A circuit breaker is usually associated with the contactor, the purpose of which circuit breaker being to open the line if an overcurrent, due for example to a short-circuit, is detected. The circuit-breaker function is necessary in order to open the line quickly, for the opening of the contactor for the purpose of cutting off the supply to the electromagnet coil would take too long because of the slow decline of the current through the coil.

The contactor and circuit breaker functions are sometimes combined in a single electric switch appliance, referred to as contactor-circuit breaker, such as the appliance described in French patent FR2638563. A protection device, such as for example a striker, is thus associated with the contact bridge of the contactor, which device acts directly on the moving contact bridge so as to open the contacts in case of detection of a short-circuit current. This appliance also comprises a lock which receives orders from the (thermal and magnetic) protective device in order to act on the supply of the coil. However, such an appliance remains bulky and expensive.

SUMMARY OF THE INVENTION

This invention therefore aims to provide the necessary control and protection functions sought in a contactor-circuit breaker appliance by means of the rapid opening of a single moving magnetic circuit acting on the contact-holders. This appliance avoids the need for mechanical protective devices, is of standard size and of low cost price.

According to the invention, the switch appliance is characterized in that the activating electromagnet and the releasing electromagnet are constituted by a single electromagnet whose moving magnetic circuit is a pivoting pallet linked mechanically to the contact-holders and having a weak moment of inertia, and in that it comprises electric means for the rapid reduction of the flux in the magnetic circuits, these means being triggered by an electronic control device associated with the current sensor.

According to an embodiment of the invention, the electric means include a rapid-opening electronic switch which is positioned in series with the coil, and an electric component or system for the rapid reduction of the current which is placed in parallel with the terminals of the rapid-opening switch so as to be in series with the coil in order to form a closed current loop when the switch is placed in the off state by the control device. Upon opening of the switch, the electric means allow the current in the coil, and consequently the flux in the magnetic circuits, to fall rapidly without altering the normal functioning of the appliance.

The electric component is preferentially constituted by a Zener diode with a controlled avalanche voltage which is less than the breakdown voltage of the rapid-opening switch.

In a particular embodiment of the invention, the electric means include the coil supply control switch and a rapid current-reduction electric component which is placed in parallel with the terminals of the coil so as to be in series with the coil when the control switch is placed in the off state by the control device.

BRIEF DESCRIPTION OF THE DRAWINGS

Other characteristics and advantages will emerge from the description and accompanying drawings.

In the accompanying drawings.

DESCRIPTION OF THE PREFERRED EMBODIMENTS

Figure 1:
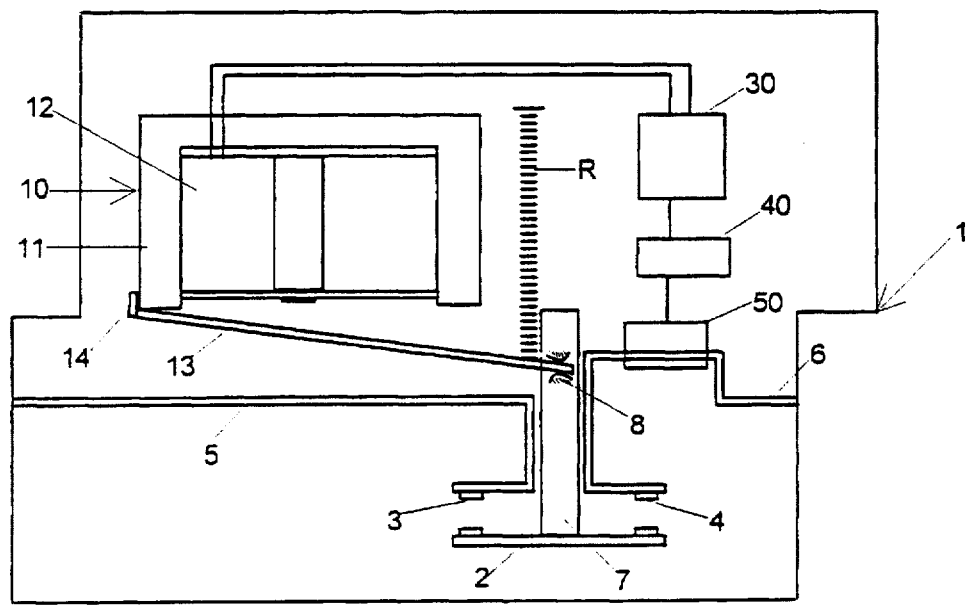
FIG. 1 shows a contactor-circuit breaker according to the invention.

The electric switch appliance illustrated in FIG. 1 is a contactor-circuit breaker which is designed to cut off or establish the passage of the current in the supply line of a load such as an electric motor. It incorporates the circuit-breaker function so as to be able to open the line rapidly in response to the detection of a fault current.

The appliance includes several power poles housed in a casing body 1, which poles each comprise a moving contact bridge 2 cooperating with fixed contacts 3, 4 which are carried respectively by conductors 5, 6. Each contact bridge 2 is mounted on a translationally guided contact-holder 7.

An electromagnet 10 is housed in the casing 1 in order to control the opening and closing of the power poles. The electromagnet 10 comprises a fixed magnetic circuit 11, a coil 12 with at least one winding L and a moving magnetic circuit 13 designed to be attracted, in the closed position, by the fixed magnetic circuit when the coil 12 is supplied in current and attracted towards an open position by at least one spring R.

The moving magnetic circuit 13 is a pivoting pallet articulated around an axis 14 and linked mechanically to the contact-holders 7 by means of an articulated mechanical liaison 8.

Since the currents induced are limited by the nature of the high resistivity material, the shape and the technology of the moving magnetic circuit, it is assumed for the purposes of this invention that the current variation in the coil is equivalent to the magnetic flux variation.

Figure 2:
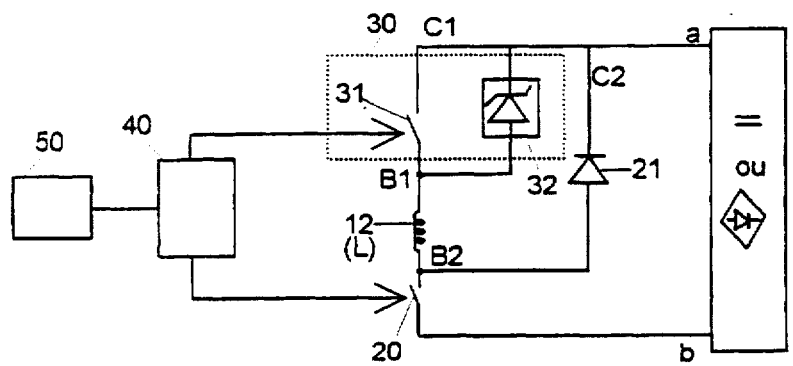
FIG. 2 illustrates an electrical diagram of a control circuit of the coil of the appliance fitted with a single winding.

The coil 12 is supplied in direct current or in rectified alternating current by a diode bridge (FIG. 2). The coil 12 positioned on a principal current path C1 between two supply lines, an outward line a connected to the terminal B1 of the coil and a return line b connected to the terminal B2.

The coil 12 supply is controlled by a switch 20 placed on the current path C1. The switch 20 is of mechanical type but may also be a semi-conductor, for example of IGBT or MOS bipolar type. Switch 20 may be associated with a current chopper device in order to regulate the current in the coil during normal functioning of the contactor. The switch 20 may be controlled by an electronic control device 40, and may be activated in the event of detection of an overload fault.

A freewheeling diode 21 is positioned on a derived current path C2 so as to be in series with the coil when the switch 20 is in the off state, its cathode and anode being linked respectively to the line a and the terminal B2 of the coil 12. This diode 21 ensures electric continuity during normal functioning of the contactor when the switch 20 is in the off state.

The appliance includes electric means 30 for the rapid reduction of the magnetic flux through the rapid decline of the current in the coil 12 of the electromagnet. These means are implemented by the electronic control device 40 in the event of detection, by at least one current sensor 50, of a short-circuit fault on the supply line of the load circuit. A current sensor 50 is placed on each current line.

The electric means 30 for the rapid reduction of the flux include a rapid-opening electronic switch 31 and a rapid current reduction electric component or system 32.

The rapid reduction of the current in the coil, and thus the rapid reduction of the magnetic flux, depend on the electrical characteristics of the component 32 and the coil 12.

The Switch 31 is placed on the principal path C1 in series with the coil 12 and the switch 20. Switch 31 is designed to be in the off state in the event of detection of a short-circuit. Switch 31 switching is controlled by the control device 40 which is capable of receiving and treating a short-circuit fault detection signal supplied by the sensor 50. In this case, supply to the coil is cut off by opening of the switch 31, irrespective of the state of the switch 20.

The electric component 32 is mounted in parallel with the terminals of the switch 31 so as to be in series with the coil 12 and the diode 21 when the said switch 31 is in the off state in order to constitute a closed current circuit.

The component 32 is preferentially constituted by a Zener diode, its cathode and anode being respectively connected to the line a and the terminal BE of the coil.

The switch 31 and the component 32 may equally be placed upstream or downstream of the coil 12, while being upstream of the switch 20.

In a non-illustrated variant of the invention, the electric component or system 32 may be an RLC-type oscillator circuit which is positioned in parallel with the terminals of the coil 12.

Finally, the freewheeling diode 21 ensures electrical continuity when the switch 31 moves to the off state. When the coil is supplied in rectified alternating current and the switch 20 is in the on state, electrical continuity may be ensured by the diode bridge instead of the diode 21.

Figure 3:
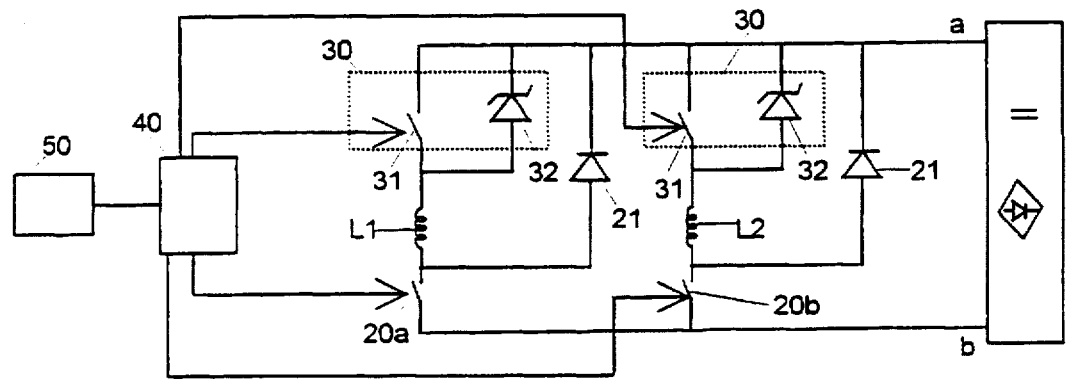
FIG. 3 shows FIG. 2 for a coil fitted with 2 windings.

FIG. 3 illustrates the diagram of FIG. 2 for a coil 12 fitted with two windings L1 and L2 placed in parallel. The winding L1 constitutes the call winding causing the moving magnetic circuit of the electromagnet to move, while the winding L2 constitutes the maintaining winding which keeps the moving magnetic circuit in the attracted position. Switches 20a and 20b respectively control the supply of each winding. A freewheeling diode 21 and electric means 30 for the rapid reduction of the magnetic flow are associated with each winding L1 and L2.

In the event of detection of a short-circuit fault during the call phase, the two switches 31 associated with the windings L1 and L2 are opened simultaneously. In the event of detection of a short-circuit fault during the maintaining phase, only the switch 31 associated with the winding L2 is opened since the winding L1 is no longer supplied.

In a non-illustrated variant of FIG. 3, the switch 20a and the diode 21 associated with the call winding L1 are eliminated. The call-maintaining commutation is here carried out by the switch 31 of the means 30 associated with the call winding L1, and electrical continuity is ensured by the freewheeling diode 21 associated with the maintaining winding L2.

Figure 4:
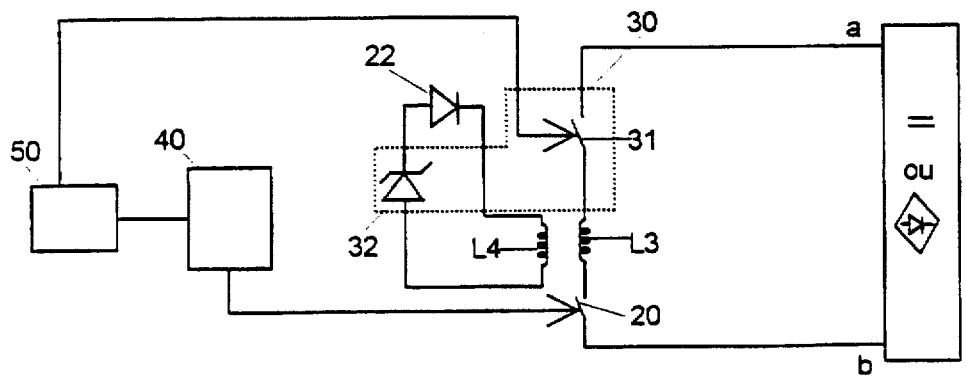
FIG. 4 illustrates a variant of FIG. 2.

In a variant of FIG. 2, as illustrated in FIG. 4, the coil 12 is constituted by a transformer T comprising a primary winding L3 and a secondary winding L4, the primary winding being placed in series with the switch 20. A diode 22 is placed in series with the secondary winding L4.

The means 30 for the rapid reduction of the flux include the rapid-opening switch 31 which is placed in series with the primary winding L3 and the electric component 32 which is constituted by a Zener diode and is placed in series with the secondary winding L4.

A description of the functioning of the appliance according to the invention will now be given with reference to FIG. 2.

In normal functioning of the contactor-circuit breaker, the supply of the coil is controlled by the switch 20, the switch 31 being in the on state. The current, and consequently the magnetic flux, follows a usual decline curve according to the electrical characteristics of the coil.

In the event of detection of a short-circuit, the sensor 50 sends a signal to the control device 40 which triggers the change of state of the switch 31 and blocks it. Owing to the value of the controlled avalanche voltage Vz of the Zener diode 32 which is much greater than the supply voltage, no current can pass from the supply line a to the line b.

The flux stored in the magnetic circuits maintains a current in the coil which then passes by the diode 21 and the Zener diode 32 by forming a closed loop. In passing by the Zener diode 32, the potential at the terminals of the coil becomes equal to the controlled avalanche voltage Vz and the magnetic flux declines according to the equation Vz/N, where N is the number of turns of the coil winding. The voltage Vz is never greater than the breakdown voltage $V_{BR}$ of the switch 31.

With reference to the circuit shown in FIG. 4, in normal functioning the current circulating through the primary winding L3 of the line a towards the line b induces a current circulating in the opposite direction in the secondary winding L4 which, however, remains blocked due to the presence of the diode 22. If the switch 31 is opened following the detection of a short-circuit, the current passing through the primary binding L3 then circulates in the reverse direction thereby inducing a current in the opposite direction in the secondary winding L4 which consequently circulates and passes by the Zener diode. The magnetic flux then declines according to the equation Vz/N4, where N4 is the number of turns in the secondary winding L4.

Figure 5:
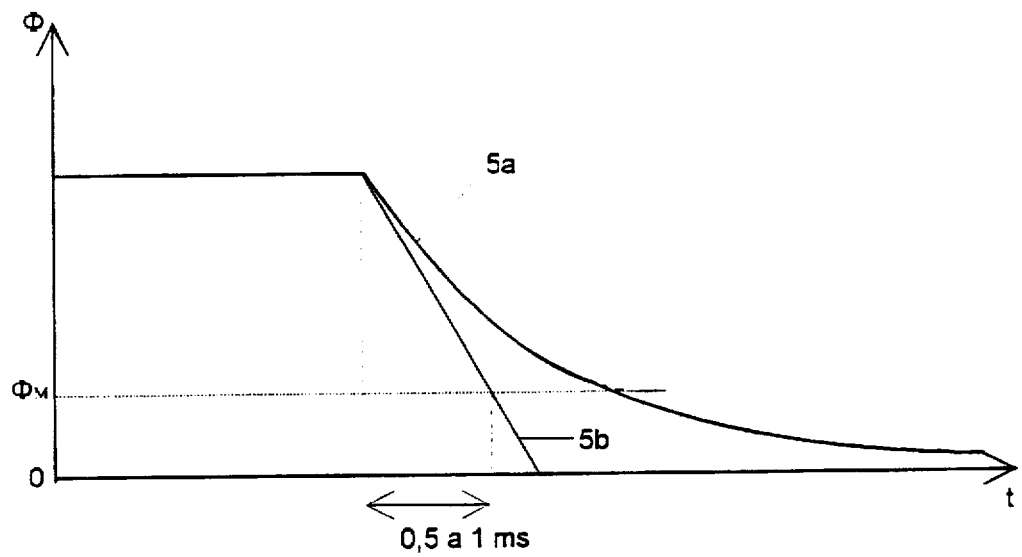
FIG. 5 illustrates the decline of the current in the coil of the appliance.

The curves 5a and 5b in FIG. 5 show respectively the results of a usual flux decline without using the Zener diode and a flux decline using the Zener diode. The rapid reduction of the flux down to a value which is less than the maintaining flux Φm for which the moving magnetic circuit is no longer attracted, thus takes place in a time of less than 3 ms compared to a time of approximately 20 ms in normal functioning of the contactor. The gap between the times of 1 ms and 3 ms is due to the mechanical inertia of the pallet which is nevertheless weak.

According to the invention, the circuit-breaker function of the contactor-circuit breaker is thus carried out firstly thanks to the rapid decline of the magnetic flux due to the presence of the electric means 30, and secondly by the special arrangement of the electromagnet whose pallet 13 possesses a weak inertia in order to ensure its rapid movement and which constitutes a direct organ for activating the contact-holders 7.

Figure 6:
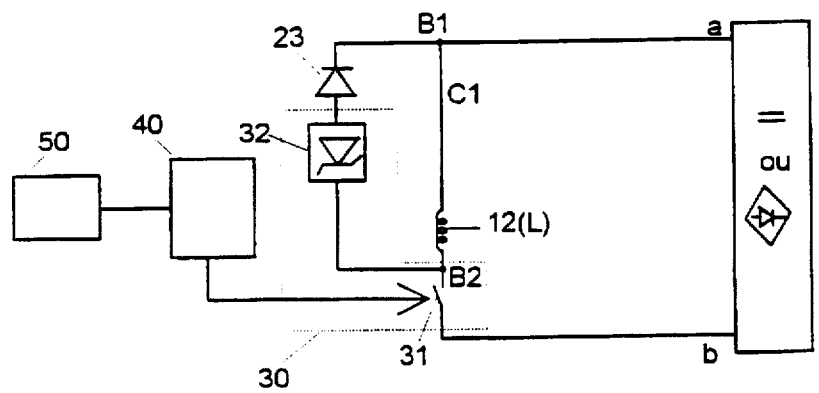
FIG. 6 shows another embodiment of FIG. 2.

In a particular embodiment of the invention illustrated in FIG. 6, the electric means 30 for the rapid reduction of the flux include the coil supply control switch 31 as a rapid-opening switch. In this case, the electromagnet is always opened rapidly. According to the diagram, the Zener diode 32 is in parallel with the terminals of the coil 12. A diode 23 is placed in series with the Zener diode 32 in order to block the passage of the current coming from the line a only when the voltage Vz is less than the maximum supply voltage. When the switch 20 is controlled so as to no longer be in the on state (in contactor function or in circuit-breaker function), the coil 12 and the Zener diode 32 form a closed current loop ensuring the rapid reduction of the current in the coil and thus of the magnetic flux.

We claim:

1. A contactor-circuit breaker housing power poles which include a moving contact bridge cooperating with fixed contacts and an electromagnet activating the moving contact bridge in a contactor mode and including a fixed magnetic circuit, a moving magnetic circuit which is pivotally pallet engaged mechanically to said moving contact bridge, a coil whose electric supply is controlled by a first switch, and at least one current sensor to control a releasing electromagnet, wherein the activating electromagnet and the releasing electromagnet are constituted by a single electromagnet, said contractor-circuit breaker comprising:

electric means for rapidly reducing magnetic flux in the fixed and moving magnetic circuits, and being triggered by an electronic control device associated with the at least one current sensor, said electric means including a rapid-opening electronic switch positioned in series with the coil, and an electric component, for rapidly reducing current, placed in parallel with terminals of the rapid-opening switch to be in series with the coil to form a closed current loop when the first switch is placed in the off state by the electronic control device.

2. A contactor-circuit breaker according to claim 1, wherein the electric component comprises a zener diode with a controlled avalanche voltage ($V_z$) less than a breakdown voltage ($V_{BR}$) of the rapid-opening electronic switch, the rapidly reducing magnetic flux being a function of the avalanche voltage ($V_z$) of the zener diode and of a number of turns of a winding of the coil.

3. A contactor-circuit breaker according to claim 1, wherein the coil has two windings, and the rapid-opening electronic switch and electric component are associated with each winding of the coil.

4. A contactor-circuit breaker according to claim 1, wherein the electric means further includes a control switch for supplying the coil, and the electric component is in series with the coil when the control switch is placed in the off state by the electronic control device.

5. A contactor-circuit breaker according to claim 1, wherein the coil comprises a transformer including a primary winding and a secondary winding, and the rapid-opening electronic switch is placed in series with the primary winding and the electric component is placed in series with the secondary winding.

6. A contactor-circuit breaker housing power poles which include a moving contact bridge cooperating with fixed contacts and an electromagnet activating the moving contact bridge in a contactor mode and including a fixed magnetic circuit, a moving magnetic circuit which is pivotally pallet engaged mechanically to said moving contact bridge, a coil whose electric supply is controlled by a first switch, and at least one current sensor to control a releasing electromagnet, wherein the activating electromagnet and the releasing electromagnet are constituted by a single electromagnet, said contractor-circuit breaker comprising:

a rapid-opening electronic switch positioned in series with the coil and being triggered by an electronic control device associated with the at least one current sensor; and a zener diode placed in parallel with terminals of the rapid-opening switch to be in series with the coil to form a closed current loop when the first switch is placed in the off state by the electronic control device.

7. A contactor-circuit breaker according to claim 6, wherein the zener diode has a controlled avalanche voltage ($V_z$) which is less than a breakdown voltage ($V_{BR}$) of the rapid-opening electronic switch.

8. A contactor-circuit breaker according to claim 6, wherein the coil has two windings, and the rapid-opening electronic switch and zenor diode are associated with each winding of the coil.

9. A contactor-circuit breaker according to claim 6, further comprising a control switch for supplying the coil, and the zener diode is in series with the coil when the control switch is placed in the off state by the electronic control device.

10. A contactor-circuit breaker according to claim 6, wherein the coil comprises a transformer including a primary winding and a secondary winding, and the rapid-opening electronic switch is placed in series with the primary winding and the zener diode is placed in series with the secondary winding.

* * * * *